United States Patent [19]

Dupre et al.

[11] Patent Number: 5,048,240

[45] Date of Patent: Sep. 17, 1991

[54] REMOVABLE COMPONENT FOR FASTENING AN ELEMENT TO BE FASTENED TO THE GROUND AND METHOD FOR IMPLEMENTATION THEREOF

[75] Inventors: Pascal Dupre, Ablis; Guy Lavo, Bonneval, both of France

[73] Assignee: Societe a Responsabilitee Limitee DL System, France

[21] Appl. No.: 533,336

[22] Filed: Jun. 5, 1990

[30] Foreign Application Priority Data

Jun. 5, 1989 [FR] France .................................. 89 07405

[51] Int. Cl.⁵ .............................................. E04D 1/34
[52] U.S. Cl. .......................................... 52/4; 52/155; 135/118
[58] Field of Search ................. 52/155, 158, 154, 165, 52/153, 146, 148, 166, 4; 135/118

[56] References Cited

U.S. PATENT DOCUMENTS

| | | |
|---|---|---|
| 2,251,624 | 8/1941 | Foree et al. ..................... 135/118 X |
| 3,115,726 | 12/1963 | Sayles ................................... 52/155 |
| 3,195,898 | 7/1965 | Respini ........................... 135/118 X |
| 4,825,600 | 5/1989 | Osgood, Sr. ...................... 52/155 X |
| 4,831,798 | 5/1989 | Otteson ............................. 52/155 X |
| 4,913,428 | 4/1990 | Naumani ........................ 135/118 X |

Primary Examiner—David A. Scherbel
Assistant Examiner—Creighton Smith
Attorney, Agent, or Firm—Hill, Van Santen, Steadman & Simpson

[57] ABSTRACT

Removable component for fastening an element (3) to be fastened to the ground (2), such as film, net for protecting a plantation fastening for horticulture, agriculture which is rigid and undeformable and comprises at least a principal elongated peg (7) intended to pass through the element (3) and to be embedded in the ground (2) and a guard (9) fastened transversaly to the principal peg (7) opposite (10) its embedding free end part (8) intended to immobilize the element (3) to be fastened by clamping against the ground (2).

38 Claims, 2 Drawing Sheets

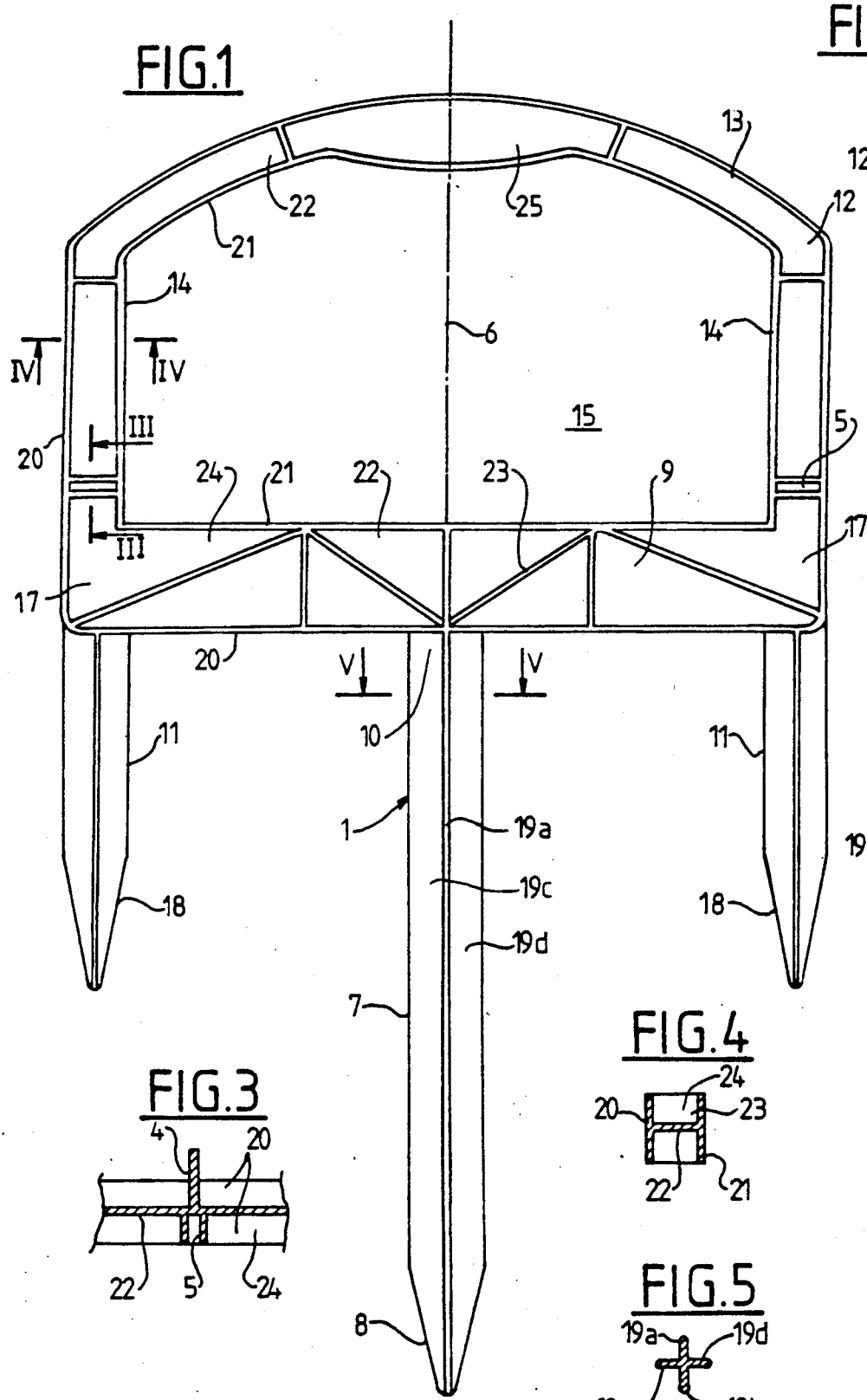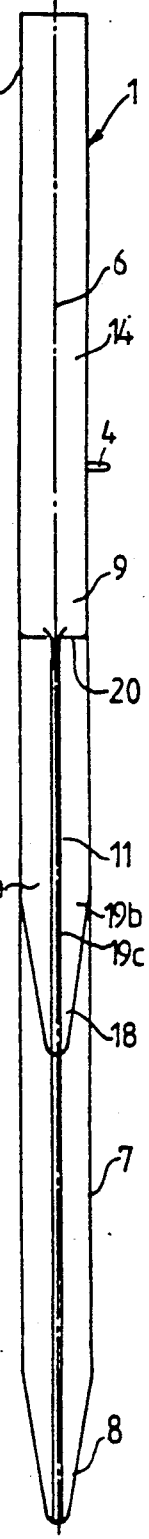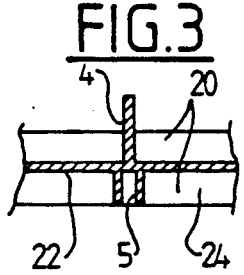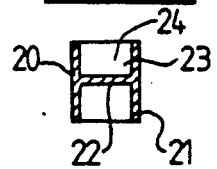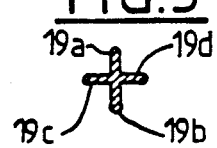

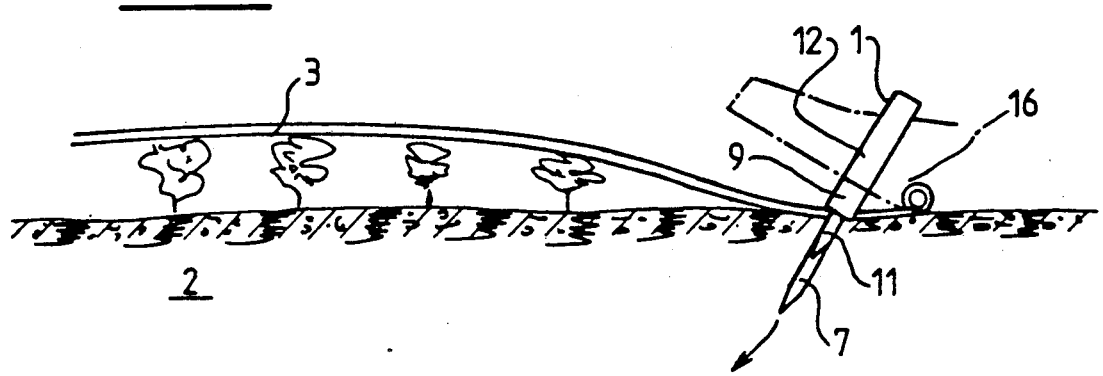
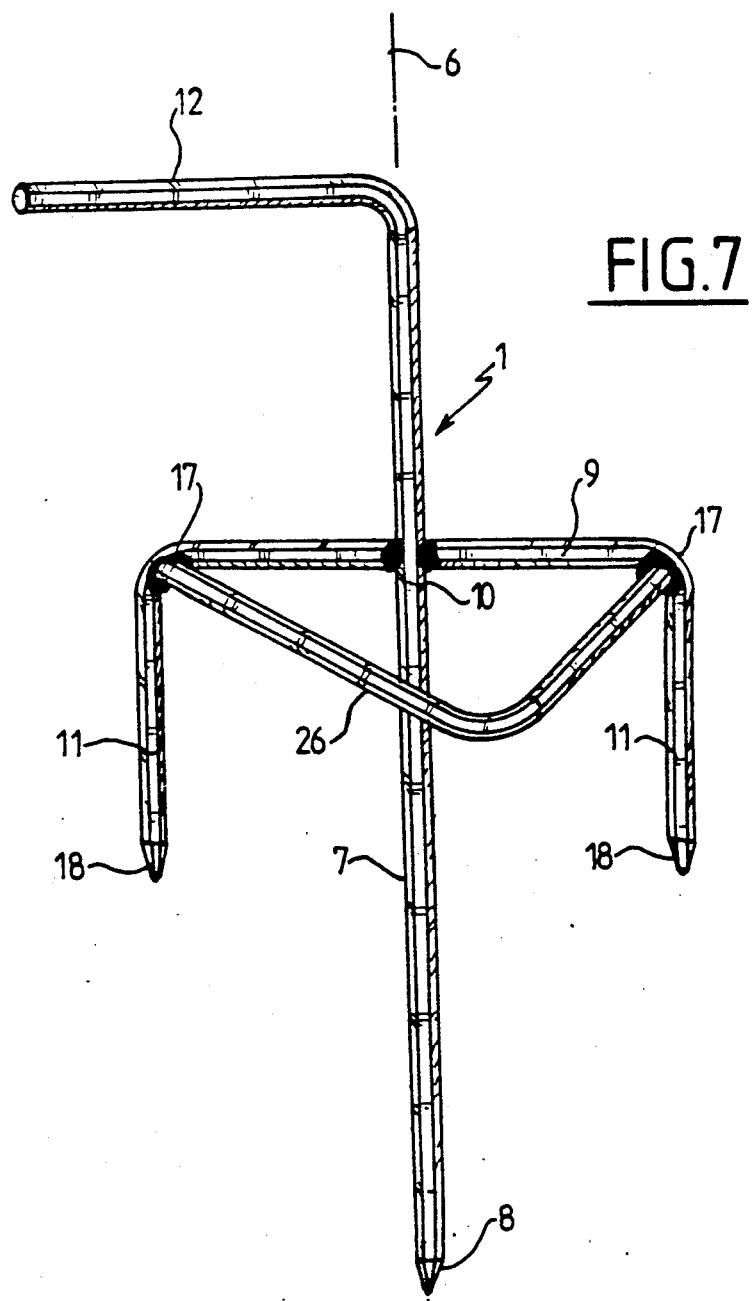

REMOVABLE COMPONENT FOR FASTENING AN ELEMENT TO BE FASTENED TO THE GROUND AND METHOD FOR IMPLEMENTATION THEREOF

The invention relates to a removable component for fastening an element to be fastened to the ground and method for implementation thereof. It is principally intended for an element to be fastened consisting of a cover, a film, a net, a strip for protecting a plantation or a crop, for horticulture, agriculture, market gardening or gardening. It may be intended for similar applications such as lines or fastenings in the same technical field.

The use of covers, films, nets, strips for protecting a plantation or a crop in the horticultural, agricultural, market-gardening and gardening field is today well known and widespread. These covers, films, nets or strips are hereinafter called "elements to be fastened". Such elements to be fastened may have various functional characteristics; transparency or opacity, a continuous or discontinuous surface, perforation or microperforation of greater or lesser size, uniformly distributed or otherwise, incorporation of functional products, etc.

Hitherto, in the most generalized practice, such elements have been fastened to the ground in the following manner: they are first arranged on the ground at the site, being sufficiently flat and stretched. Next, the user then immobilizes them on the ground by throwing onto them, at intervals, particularly on the edges, mounds of earth taken from the vicinity by means of a shovel or spade. This is a manual operation and it can be mechanized only with difficulty. Although generalized, it also has several drawbacks: retention of the element to be fastened is not perfect; it cannot be controlled; it can be affected, particularly in the event of rain or humidity; the earth often tends to spread in an exaggerated manner over the element to be fastened beyond what is strictly necessary or, on the other hand, outside of the element which, in both cases, is undesirable. Although the fastening operation performed in this manner presents problems and drawbacks, the same applies to the reverse procedure, which consists in removing the earth from the element to be fastened when this is deemed necessary.

In the literature, hooks or stakes intended to fasten such elements to be fastened to the ground have been proposed. However, it must be observed that such hooks or stakes have hitherto not been a commercial success, undoubtedly due to their deficiencies. Document FR-A-1,412,395 describes a metal T-shaped hook buried in the earth in a line of holes. However, such a hook is inclined not to remain driven into the ground. Its handling, positioning and deliberate removal are inconvenient. It is impossible visually and rapidly to check the hooks which have been positioned. Due to their design, the hooks cannot be stacked or superposed during storage or positioning or removal and, on the other hand, there is a risk of the various hooks hooking onto one another in an undesirable and disordered manner. Such hooks thus do not permit necessary methods for positioning and removal.

Document U.S. Pat. No. 3,903,626 describes an anchorage in the ground comprising a rod provided with a screw thread and a head mounted so as to pivot on the rod opposite to the tip thereof. This anchorage comprises several components which are mutually accessible so that its cost is definitely prohibitive for large-scale use. Such an anchorage also presents the same drawbacks as those mentioned above with reference to the hook according to document FR-A-1,412,395.

Document U.S. Pat. No. 4,026,094 describes a structure which can also act as a stake but which is, moreover, intended to be included in a rake. This structure comprises a main post fastened to a plate to which, moreover, a small spike is fastened. The post is intended to be driven only into the ground, whereas the small spike is intended to be driven only into the ground covering. Consequently, the implementation of such a structure involves extreme accuracy which is incompatible with elements to be fastened having large surface areas, such as those used today in agriculture. Moreover, the drawbacks already encountered above are likewise not solved by this structure.

Document U.S. Pat. No. 4,825,600 describes a multi-purpose anchorage: for the garden or for concrete. This anchorage comprises two components which are movable relative to one another and detachable from one another, both produced in the form of angle iron: the first post form is intended to be driven into the ground, passing through the cover to be held. Unlike its free end point, it ends in a handle. In the centre thereof, it comprises a loop for holding a loop in the second component. The latter, in addition to its centre loop, comprises two end feet curved into a loop. These feet are intended to bear against the cover. Because of the loops, the second component is distanced from its cover except insofar as the two feet are concerned, which two feet do not pass through the cover and are not embedded in the ground. Such an anchorage presents not only the drawbacks of the deformable structures but, in addition, the two components may be disassociated from one another inadvertently. As already mentioned, the presence of the loops may lead to the unexpected hooking of the anchorages. The anchorage comprises only a single post capable of pivoting and of disengaging from the ground. Embedding in the ground is inconvenient. Subsequent retention of the cover is random and unsatisfactory and, over time, the anchorage may become loose and unfastened. Production in the form of angle iron lacks rigidity.

SUMMARY OF THE INVENTION

The invention aims to permit an effective removable fastening for elements to be fastened such as those expressly referred to here: cover, film, net, strip for protecting a plantation or a crop, for horticulture, agriculture, market gardening or gardening, or similar applications thereof (such as a line or fastening). In fact, such elements to be fastened, in this technical field, involve a number of very specific constraints, and it must be possible to use the fastening device in great quantity and thus it must be possible for it to be stored and arranged easily. It must be possible for it to be positioned easily. Its positioning must be secure, including in the event of outside constraint: wind, tension exerted on the element to be fastened, movable or muddy nature of the ground. Once in place, it must be possible to check the presence and the position of the device. Removal of the devices, when necessary, must be possible, as must be their use. Positioning, storage and removal must be compatible with mechanization. The device must be small, lightweight, strong and resistant to aggression from outside (humidity, fertilizers, enriching agent, etc.). Finally, bearing in mind the large number of devices used, the cost price must be reasonable.

To this end, the invention first proposes a removable fastening component which, on the one hand, is rigid and undeformable and, on the other hand, comprises:

a principal elongated peg 7 intended to pass through, with its embedding free end part 8, the element 3 to be fastened and to be embedded in the ground 2;

a guard 9 fastened transversely to the principal peg 7 opposite to its embedding free end part 8, intended to immobilize the element 3 to be fastened by clamping against the ground 2; characterized in that it also comprises, at least one secondary elongated peg 11, substantially parallel to and distanced transversely opposite the principal peg 7, fastened to the guard 9 intended to be embedded in the ground 2;

and a handle 12 located, relative to the guard 9, on the side opposite to that where the principal and secondary pegs 7, 11 are located, such that, the fastening component 1 being driven into the ground and the element 2, 3 to be fastened, the handle 12 is permanently visible and accessible above the ground and the element 2, 3 to be fastened.

In the preferred embodiment, the component is such that it also comprises two secondary elongated pegs 11, substantially parallel to and distanced transversely opposite and symmetrically to the principal peg 7, fastened to the two ends 17 of the guard 9, having a length which is smaller than that of the principal peg 7;

and a handle 12 having a generally arched shape and comprising a core 13 for gripping and handling and, on either side of the core 13, two arms 14 which are substantially collinear and opposite to the two secondary pegs 11, connecting the core 13 to the guard 9; the core 13 and the two arms 14 of the handle 12 and the guard 9 defining a free access opening 15 forming a passage for a driving-in or removal member 16; the guard 9 and the handle 12 each forming a stress component capable of taking up the forces imparted to the fastening component 1 for driving it into or removing it from the ground 2 and the element 3 to be fastened; the component 1 being produced from profiled plastic with a cross-section and being entirely included between two envelope planes ($P_1$, $P_2$) parallel to one another and close to one another.

The invention also relates to a method for fastening an element to be fastened to the ground, usually employing a plurality of such components.

The other features and advantages of the invention will become apparent in the light of the following description which refers to the appended drawings, in which:

FIG. 1 is a view in elevation of a first alternative embodiment of a fastening component according to the invention.

FIG. 2 is a side view of the fastening component according to FIG. 1.

FIGS. 3, 4 and 5 are three sectional views of the fastening component, along the lines III—III, IV—IV and V—V in FIG. 1.

FIG. 6 is a diagrammatic sectional view through a vertical plane illustrating the implementation of the fastening component according to FIGS. 1 to 5.

FIG. 7 is a perspective view of a second embodiment of a fastening component according to the invention.

The invention relates to a removable component 1 for fastening an element 3 to be fastened to the ground 2.

As already indicated, the element 3 to be fastened is a cover, a film, a net, a strip for protecting a plantation or a crop, such as that which is used for horticulture, agriculture, market gardening and gardening. If appropriate, the element 3 to be fastened constitutes a similar application of the fastening component 1, particularly a line or fastening.

The component 1 is rigid and undeformable overall. It is preferably produced in a single block. If it is made from several parts or components, these are rigidly fixed together without it being possible for them to rotate, pivot, slide or disengage unexpectedly. To this end, the component 1 is preferably produced from hard and rigid plastic and may be filled with glass fibres imparting solidity and lightness thereto.

Except for male hooking connecting or engaging members 4, which will be referred to below, the component 1 is entirely included between two envelope planes ($P_1$, $P_2$) which are parallel to one another and close to one another. The planes $P_1$ and $P_2$ are clearly visible in FIG. 2. They are parallel to the plane of FIG. 1. A plane P equidistant from the two planes $P_1$ and $P_2$ constitutes a plane of symmetry of the component 1 (except insofar as the male and female hooking members 5 are concerned) in which the latter extends. The distance between the two envelope planes is between approximately 0.6 cm and 2 cm, in particular of the order of 1.3 cm. The size of the component 1 (in the planes P, $P_1$, $P_2$) is of the order of approximately thirty centimeters in length and of the order of approximately fifteen centimeters in width, it being specified that these dimensions are given only by way of indication. The component preferably also comprises a second plane of symmetry Q perpendicular to the plane P, the intersection between the planes P and Q defining a general axis 6 corresponding to the general direction along which the component 1 is displaced by sliding in order to be driven in or, on the other hand, removed. The general axis extends along the length of the component 1. The plane Q is clearly visible in FIG. 1 and it is perpendicular to the plane of FIG. 1.

The component 1 comprises, firstly, a principal peg 7 which is elongated parallel to the axis 6, intended to pass through, with its embedding free end part 8, the element 3 to be fastened and to be embedded in the ground 2.

The component 1 comprises, secondly, a guard 9 fastened transversely, namely perpendicularly, to the principal peg 7 at a part 10 located opposite the embedding free end part 8, and this guard 9 is intended, in particular, to immobilize the element 3 to be fastened by clamping against the ground 2, and this applies over the entire length of the guard 9. In the embodiment envisaged, it extends substantially straight.

The component 1 also comprises, thirdly, at least one secondary peg 11 which is elongated, substantially parallel to and distanced transversely opposite the principal peg 7 and is fastened to the guard 9. Such a secondary peg 11 is intended at least to be embedded in the ground 2 and, usually, also to pass through the element 3 to be fastened.

The component 1 comprises, fourthly, a handle 12 located, relative to the guard 9, on the side opposite to that on which the pegs 7, 11 are located. Thus, when the component 1 is driven into the ground 2 and the element 3 to be fastened, the handle 12 is permanently visible and accessible above the ground 2 and the element 3 to be fastened (see FIG. 6). This permits, in particular, efficient and rapid checking of the presence and the position of the fastening components 1.

More detailed reference is now made to the first alternative embodiment (FIGS. 1 to 5). In this case, and according to the preferred embodiment, the handle 12 is fastened to the guard 9. This handle 12 has a generally arched shape and comprises a core 13 for gripping and handling and, on either side of the core 13, two arms 14 connecting the core 13 to the guard 9. The core 13 and the arms 14 of the handle 12 and the guard 9 define a free access opening 15 forming a passage for a driving-in or removal member 16, 3 which may be a foot of the user, of the component 1 in the ground 2 and the element 3 to be fastened, particularly the foot of the user. For example, the opening 15 has a size of the order of slightly less than 15 centimeters in the direction of the guard 9 and the core 13 located opposite. The core 13 is preferably curved with its concavity facing the guard 9; the two arms 14 are substantially parallel to one another and they are fastened substantially at the two opposite ends 17 of the guard 9. An arm 14 and a secondary peg 11 are substantially collinear and opposite to one another, that is to say that a secondary peg 11, like the principal peg 7, is directed in the opposite direction to the handle 12 and, in particular, the core 13.

The component 1 preferably comprises two secondary pegs 11 and the principal peg 7 is located substantially in the centre of the guard 9, its longitudinal axis being the axis 6, the principal peg 7 then being equidistant from the two secondary pegs 11. A secondary peg 11 is also preferably located substantially at one end 17 of the guard 9, opposite an arm 14 in the same fastening area of the latter to the guard 9, namely its end 17.

Bearing in mind the symmetry already shown in FIGS. 1 and 2, a secondary peg 11 has a length which is smaller than that of the principal peg 7. For example, the length of the secondary peg 11 is between approximately one third and two thirds of the length of the principal peg 7, in particular of the order of half. All the lengths are counted parallel to the direction of the general axis 6. Bearing in mind the distances given above in connection with the handle 12, it appears that the pegs 7, 11 extend over a length which is more than half the overall length of the component 1.

All the embedding free end part 8 of the principal peg 7 and that 18 of the secondary pegs 11 are tapered to a point.

A principal, secondary peg 7, 11 preferably has a shape which permits longitudinal embedding and prevents any pivoting about the longitudinal direction. For example, a principal, secondary peg 7, 11 has, in cross-section, a cross or star shape having several arms. In particular, all the pegs 7, 11 have the same cross-section. In the case of FIGS. 1 to 5, this cross-section has a form of a cross with four arms 19a, 19b, 19c, 19d which appear identical, and pairs of which are perpendicular. The guard 9 and the handle 12 each form a stress component capable of taking up the forces imparted to the fastening component 1 for driving it into or removing it from the ground 2a and from the element 3 to be fastened. To this end, the guard 9 is limited by two opposing longitudinal edges 20, 21 on the side of the principal and secondary pegs 7, 11 and on the side of the handle 12, which, respectively, have the roles of forming a gripping support for the element 3 to be fastened and an entry support for a driving-in member 16. These edges 20, 21 are substantially perpendicular to the planes P and Q. They have a certain width which is the thickness of the component between the two planes $P_1$ and $P_2$, which permits exertion of pressure for driving in and for immobilization of the element 3 to be fastened. These edges 20, 21 form the lateral wings of a substantially H-profiled (in cross-section) component which also comprises a central core 22 located in or substantially in the plane P. Likewise, in cross-section, the handle 12 has a substantially H-profiled form, the lateral wings 20, 21 and the central core 22 of which are in the extension of those of the guard 9 (FIG. 4). Moreover, the guard 9 of the handle 12 also comprises internal strengthening wings 23 located in the two openings 24 of the H. If the H-shaped profile remains generally constant in size and in form over the entire length of, on the one hand, the guard 9 and, on the other hand, the handle 12, it may be variable, if appropriate. For example, the core of the handle 12 comprises a bulging central area 25.

According to a major improvement of the invention, in the first alternative embodiment in question (FIGS. 1 to 5); the component 1' also comprises male 4 and female 5 hooking connecting or engaging members located on the two envelope planes, which permit, via their mutual interaction, the superposition and the retention of several fastening components 1 against one another.

The members 4, 5 are preferably placed (FIG. 3) on the arms 14, particularly in the vicinity of the guard 9: the female member 5 may consist of a socket formed by two closely spaced transverse wings of the H of the arm 14. The male member 4 may be located opposite and perpendicular to the female member or socket 5, projecting relative to the envelope plane.

Reference is now made to the detailed plan of the second alternative embodiment (FIG. 7). In this alternative embodiment, the component 1' is produced from hexagonal-section galvanized steel profiled rods which are shaped and welded together. The principal peg 7' and the handle 12' form a rod bent at a right angle, one part forming the principal peg 7' and the other forming the handle 12'. The guard 9 and the two secondary pegs 11' form a rod which is doubly bent at a right angle in a U (or in the normal position of use an inverted U). The guard 9' is welded and thus uniformly connected to the top of the principal peg 7'. In the embodiment shown, the handle 12' extends substantially parallel to the guard 9'. The guard 9' may also be extended in the direction or the plane at least substantially perpendicular to the plane formed by the principal 7 and secondary 11' pegs by means of a plate or an iron or additional profiled section 26' bent into a U and fastened via its ends 17', by means of welding, to the angles between the guard 9' and the secondary pegs 11'. In an alternative embodiment, this embodiment may also be produced from plastic, in particular reinforced plastic of profiled form, particularly H-shaped in cross-section.

Whether this is the first or the second embodiment, these can have common additional features. For example, the component 1 may have a colour which contrasts with those of the element 3 to be fastened, the ground and the plants. The component 1 may be adjustable, in particular, with regard to the length of the pegs 7, 11, the guard 9 and the pegs 7, 11 being mounted so as to slide with locking along the axis 6. The component 1 may receive identification elements.

The invention also relates to a method for fastening an element 3 to be fastened, such as that described above, to the ground 2. In this method, the element 3 to be fastened is arranged on the ground 2 and at least one fastening component 1, such as described, is driven into the ground and the element to be fastened, the element 3 to be fastened either having, to this end, openings or, usually, it is devoid thereof and is pierced by the end parts 8, 18 of the pegs 7, 11 as a result of the force exerted on the component 1 in order to drive it into the ground. Several fastening components (1) are preferably and generally used distributed along the element (3) to be fastened.

The element 3 to be fastened is passed through using the principal and secondary pegs 7, 11, the guard 9 being applied on the element 3 to be fastened. In order to use a fastening component 1, this is slipped over a driving-in member 16 and pressure is applied to the guard 9. Pressure is preferably applied to the guard 9 in a direction which is inclined relative to the ground 2 on the side opposite to the tension exerted by the element 3 to be fastened (FIG. 6).

We claim:

1. A component for removably fastening a sheet-like element to the ground, said component having means for clamping the sheet-like element against the ground including a guard, an elongated principal peg having one end rigidly connected to the guard and the other end being free for passing through the sheet-like element and embedment in the ground, an elongated secondary peg being rigidly connected to said guard and extending parallel to said principal peg, said secondary peg having a free end for embedment in the ground, and a handle rigidly connected to one of said guard and principal peg and extending from said guard on a side opposite said pegs so that when the component is embedded in the ground to fasten a sheet-like element thereto, said handle is permanently visible and accessible above the ground and element.

2. A component according to claim 1, wherein the handle is fastened to said guard.

3. A component according to claim 2, wherein the handle has a generally arch shape and includes a core for gripping and handling and a pair of arms connecting said core to said guard.

4. A component according to claim 3, wherein the core of the handle includes a central bulging area.

5. A component according to claim 3, wherein the core and arms of the handle and the guard define a free access opening forming a passage for receiving a member for driving in and removing the component from the ground.

6. A component according to claim 3, wherein the core is curved with a concavity facing the guard.

7. A component according to claim 3, wherein the two arms are substantially parallel to each other.

8. A component according to claim 3, wherein the pair of arms are fastened substantially at the ends of said guard.

9. A component according to claim 3, which includes two secondary pegs, said secondary pegs and arms being substantially colinear and extending opposite to one another from said guard.

10. A component according to claim 1, wherein the principal peg is located substantially in the center of the guard.

11. A component according to claim 1, wherein the secondary peg is located substantially at an end of the guard.

12. A component according to claim 1, which has two secondary pegs.

13. A component according to claim 12, wherein the two secondary pegs are substantially identical and are arranged symmetrically relative to the principal peg.

14. A component according to claim 1, wherein the secondary peg has a length which is smaller than the principal peg.

15. A component according to claim 14, wherein the length of the secondary peg is between approximately $\frac{1}{3}$ and $\frac{2}{3}$ the length of the principal peg.

16. A component according to claim 1, wherein the principal peg and the secondary peg each have a free end which is tapered to a point.

17. A component according to claim 1, wherein the principal peg and secondary peg each have a form permitting longitudinal embedment and prevent any pivoting about a longitudinal direction.

18. A component according to claim 17, wherein the principal peg and secondary peg have a cross section comprising several arms.

19. A component according to claim 1, wherein the guard extends substantially straight.

20. A component according to claim 1, wherein the guard forms a stress component capable of taking up the force imparted to the component in order to drive it into and remove it from the ground and the element to be fastened thereby.

21. A component according to claim 1, wherein the handle forms a stress component capable of taking up the forces imparted to the component for driving it into and removing it from the ground and the element to be fastened thereby.

22. A component according to claim 1, wherein the guard is limited on two opposite longitudinal edges by flanges with one of the flanges being on the side of the principal peg and secondary peg and the other of the two flanges facing the handle, said flanges forming a portion of the clamping means to hold the sheet-like element against a ground surface.

23. A component according to claim 1, wherein the guard and the handle each have a cross section with a substantially H-shaped profile having a central web and two laterally extending flanges.

24. A component according to claim 23, wherein the guard and handle also include internal strengthening flanges extending between the two laterally extending flanges of the H-shaped profile.

25. A component according to claim 1, which is produced from a plastic material.

26. A component according to claim 25, wherein the plastic material is filled with a fiber glass to impart solidity and lightness.

27. A component according to claim 1, wherein the handle, guard and pegs extend in a plane between two enveloping planes that are parallel to one another.

28. A component according to claim 27, wherein the distance between the two enveloping planes is in a range of between 0.6 cm and 2 cm.

29. A component according to claim 27, which includes a male connecting member extending from one of the two enveloping planes and a female connecting member aligned with the male member and extending inward from the other plane so that two components can be connected together by the male member of one component being received by the female connecting member of the other component.

30. A component according to claim 1, which has two secondary pegs extending from the guard with the principal peg disposed therebetween, said two secondary pegs having a length smaller than the length of the principal peg, said handle having a generally arch shape comprising a core for gripping and handling with two arms extending from said core, said two arms being colinear with said two secondary pegs, with the core, two arms and guard defining a free access opening on a side of the guard opposite said pegs, said component being produced from a plastic material with a cross sectional profile being entirely included between two enveloping planes extending parallel to one another.

31. A component according to claim 1, wherein the component is a plastic one-piece member having two secondary pegs extending from the ends of the guard, said handle has a curved portion with two arms, said two arms being extension of said secondary pegs so that the handle and guard form an enclosed passage, said handle and guard having an H-shaped cross section with a web and two laterally extending flanges, said pegs extending from one of said flanges of the guard and said secondary pegs having a length approximately half the length of the principal peg.

32. A component for fastening a sheet-like element to a ground surface, said component comprising a first member forming a principal elongated peg having a sharpened end, said member extending into a right angle bend opposite said pointed end to form a handle, a guard being rigidly secured on said first member and extending transverse to the axis of said first member, said guard, at each end, being bent at right angles to form a secondary peg extending parallel to the primary peg, said secondary pegs having a length smaller than the primary peg.

33. A component according to claim 32, which includes a third member being secured to said guard and extending in a plane substantially perpendicular to a plane formed by the principal and secondary pegs.

34. A component according to claim 33, wherein said third member comprises a rod-like member bent into a U shape.

35. A method for fastening a sheet-like element to a ground surface, said method comprising the steps of providing at least one rigid component having means for clamping the element against the ground including a guard, an elongated principal peg extending from said guard and having a sharpened free end for penetrating through said sheet-like element, at least one elongated secondary peg extending from said guard parallel to said primary peg and spaced therefrom, and a handle extending from a side of the guard opposite said pegs; placing an edge of the sheet-like element on said ground, and passing said primary and secondary pegs of said component through said sheet-like element and into said ground to have the guard engage an upper surface of the sheet-like element and clamp it against the ground with the handle being visible and extending above said ground and element.

36. A method according to claim 35, which includes providing a plurality of said components, and said method comprising the step of taking a second component and spacing it along said element from the first fastened component and passing the pegs of the second component through said sheet-like element for embedment in the ground to clamp the sheet between the ground and the guard of said second component.

37. A method according to claim 35, wherein the step of inserting the component through the sheet-like element and to embed the pegs in the ground applies pressure to the guard on a side opposite to the location of said pegs.

38. A method according to claim 37, wherein the step of applying pressure to the guard applies pressure to the guard at an angle inclined relative to the ground.

* * * * *